United States Patent
Neff et al.

Patent Number: 6,018,498
Date of Patent: Jan. 25, 2000

[54] AUTOMATED SEISMIC FAULT DETECTION AND PICKING

[75] Inventors: Dennis B. Neff; John Richard Grismore; William Allen Lucas, all of Bartlesville, Okla.

[73] Assignee: Phillips Petroleum Company, Bartlesville, Okla.

[21] Appl. No.: 09/145,811

[22] Filed: Sep. 2, 1998

[51] Int. Cl.[7] .................................................. G01V 1/30
[52] U.S. Cl. ................................................. 367/72; 367/73
[58] Field of Search ............................... 367/15, 16, 106, 367/72, 38, 73, 68; 340/15.5

[56] References Cited

U.S. PATENT DOCUMENTS

| | | | |
|---|---|---|---|
| 3,931,609 | 1/1976 | Anstey | 340/15.5 |
| 4,403,312 | 9/1983 | Thomason | 367/56 |
| 4,633,402 | 12/1986 | Flinchbaugh | 367/38 |
| 4,633,448 | 12/1986 | Koeijmans | 367/72 |
| 4,672,546 | 6/1987 | Flinchbaugh | 367/38 |
| 5,153,858 | 10/1992 | Hildebrand | 367/72 |
| 5,432,751 | 7/1995 | Hildebrand | 367/72 |

*Primary Examiner*—Christine K. Oda
*Assistant Examiner*—Anthony Jolly
*Attorney, Agent, or Firm*—George E. Bogatie

[57] ABSTRACT

A computer implemented method and apparatus is disclosed for automatically picking faults in a recorded 3D seismic trace data volume. The method employs test planes, which are mathematically inserted into the seismic data volume to approximate dip and azimuth of a potential fault plane surface. A large number of data points, which are selected points on the seismic traces, are defined within the seismic volume, such that each test plane positioned in the seismic volume contains data points corresponding to at least a significant portion of a trace. The method then determines a factor for each data point which is representative of the probability that the data point resides on a fault plane. This probability is based on planar discontinuity and average amplitude difference between corresponding traces in adjacent parallel test planes, and the method selects locations, in an x, y grid, of a strip of locations having high probability of residing on a fault surface. The strip of the selected locations is smoothed to a line and used to construct fault lineaments displays in seismic sections or time slices. The fault lineaments are stored in a computer data file, and conventional, stratigraphically enhanced, or other seismic data enhanced for seismic attributes is merged with the fault lineament files to create consolidated displays to aid interpretation of the data volume.

16 Claims, 10 Drawing Sheets

○ STRIP ON TIME SLICE 1
● STRIP ON TIME SLICE 2

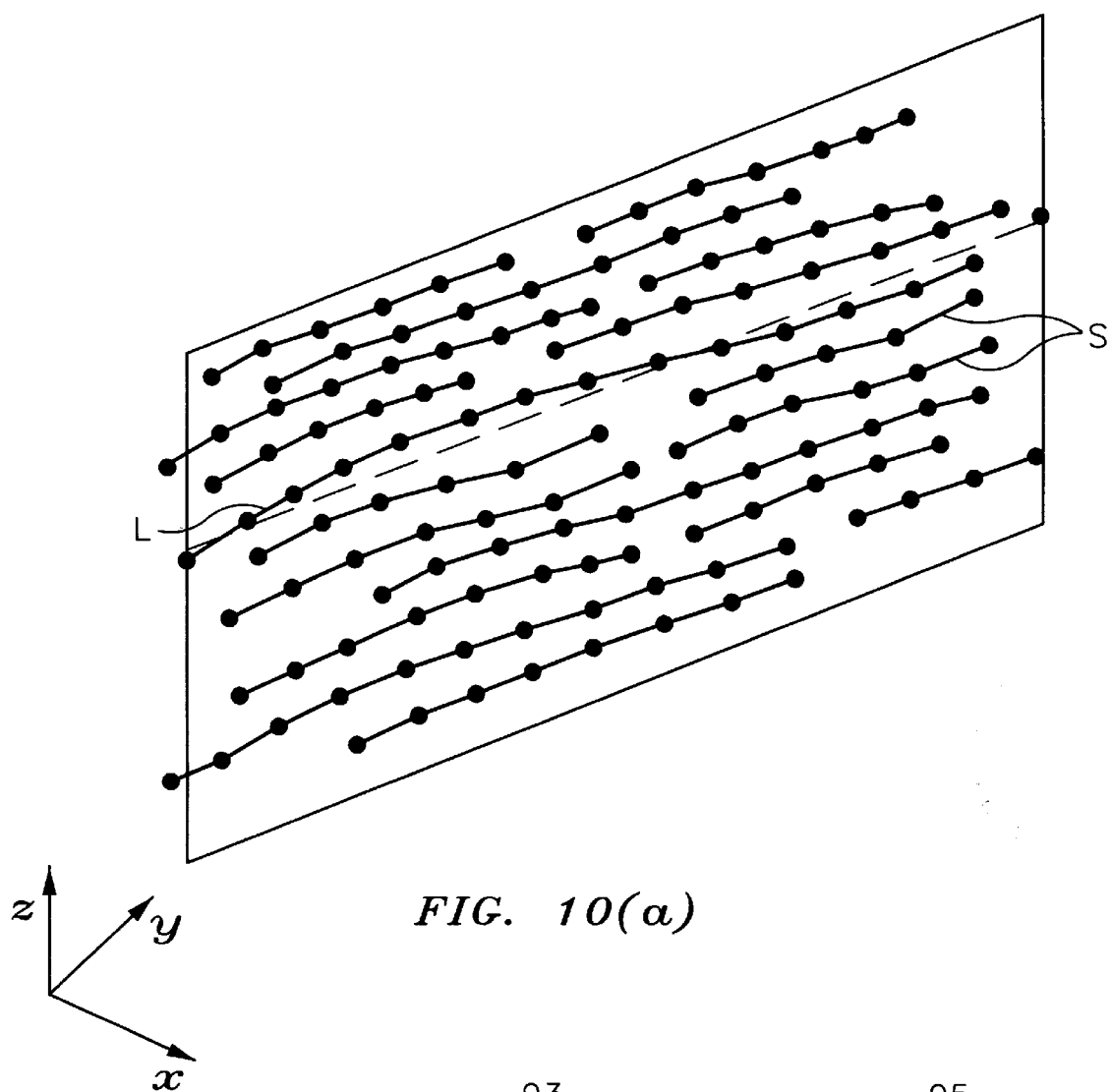
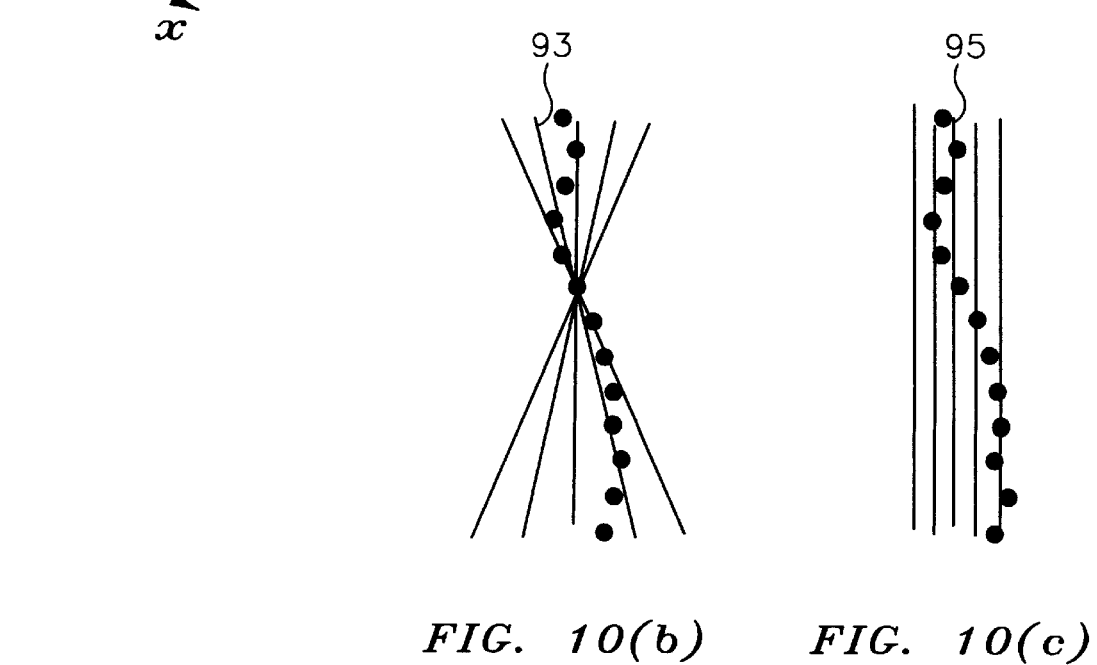
FIG. 10(a)
FIG. 10(b)    FIG. 10(c)

AUTOMATED SEISMIC FAULT DETECTION AND PICKING

The present invention relates to processing of seismic reflection data performed in a high-speed digital computer, and more particularly to a computer implemented method for rapidly producing a reliably enhanced display of subterranean faults.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earth's surface. Offshore, airgun sources and hydrophones are commonly used. The acoustic waves generated in the earth by these sources are transmitted back from strata boundaries and/or other discontinuities and reach the surface at varying intervals of time, depending on the distance traversed and the characteristics of the subsurface traversed. On land these returning waves are detected by the geophones, which function to transduce such acoustic waves into representative electrical analog signals. In use an array of geophones is generally laid out along a line to form a series of observation stations within a desired locality, the source injects acoustic signals into the earth, and the detected signals are recorded for later processing using digital computers, where the analog data is generally quantized as digital sample points, e.g., one sample every two milliseconds, such that each sample point may be operated on individually. Accordingly, continuously recorded seismic field traces are reduced to vertical cross sections of the earth, which approximate subsurface structure. The geophone array is then moved along the line to a new position and the process repeated to provide a seismic survey. Seismic data processing techniques such as migration of reflections, which permit the geological structure of subsurface to be accurately determined, are well known to those skilled in the art.

More recently, seismic surveys involve geophones and sources laid out in generally rectangular grids covering an area of interest so as to survey a large area, and enable construction of three dimensional (3D) views of reflector positions over wide areas. A major advantage of 3D technology is in allowing seismic data to be displayed in horizontal or "map" format. While faults are readily seen on vertical cross sections, many adjacent sections must be examined to determine the lateral extent of faulting. A horizon slice which illustrates a generally horizontal surface cut through the 3D seismic data volume can show the lateral extent of the fault as well as the stratigraphic features of horizons.

As explorationists seek new areas in which to find hydrocarbons, many of the new areas under exploration contain complex geological structures, and rapid analysis of seismic data for interpreting structure in these areas is a distinct advantage. Common subterranean structures that provide geologists with more detailed understanding of reservoirs include stratigraphic horizons and faults. As used herein, a horizon is a surface separating two different rock layers that is associated with a seismic reflector, and which reflector can be detected over a large area. A fault, which is likewise associated with a disruption or offset of seismic reflectors, is a displacement of rocks along a shear surface.

Stratigraphic interpretation identifying horizons and/or faults on a seismic section is accomplished by a technique known as "picking" where a common seismic trace attribute, such as trace amplitude, is selected for tracking across a vertical cross section or horizontal slice seismic record to track the reflector. Manual picking of seismic attributes for visualizing stratigraphic and fault information from seismic amplitude by drawing with colored pencil on paper or with a cursor on an interactive computer screen, as practiced in the past, can be complex, tedious and imprecise. And creating a consistent geological interpretation from large 3D seismic data volumes often requires separate, time-consuming interpretations of both faulting and stratigraphy. These interpretations must then be integrated into a single, final interpretation.

Automating the seismic attribute picking process has been pursued in the seismic industry for some time, however, no fully satisfactory automated method has been achieved. This is because no one scheme of numerical enhancements to the picking process is universally applicable to all seismic data, or even applicable within different sections of the same 3D data volume.

Accordingly, it is an object of this invention to more universally, consistently and accurately identify faults in seismic sections compared to current manual or semi-automated techniques.

A more specific object of this invention is to provide a method for automatic fault picking of up to 99% of seismically detectable faults in 3D seismic subvolumes.

Another object is to create a 3D fault plane data volume that facilitates fault analysis and accelerates by at least two fold a fault analysis using conventional picking methods.

Yet another object is to create a data volume that better displays faults in 3D animation and in rendered visualization on computer workstations.

Still another object is to provide a technique in which conventional seismic data is merged and displayed in combination with fault enhanced data.

Another object is to provide a method for which stratigraphically enhanced seismic data or geological property enhanced data is merged and displayed in combination with fault enhanced data.

Still another object is to automatically pick fault planes on multiple seismic lines so as to eliminate a major portion of the manual picking process.

A still more specific object is to detect faults having minimal offsets.

SUMMARY OF THE INVENTION

According to this invention the foregoing and other objects and advantages are attained in a computer implemented method for automatically picking discontinuities in 3D seismic data which tend to have planar distributions. The method is based on computer processing of a digitized 3D seismic data volume containing traces recorded in a survey, which have been appropriately collected, stacked and migrated. A preliminary step for automatically picking a subterranean fault plane is converting the seismic data volume to a fault plane data volume containing probability factors, designated herein as FP values, which are representative of the probability that points in the seismic volume reside on a subterranean fault plane. The conversion step involves defining two or more parallel adjacent test planes of selected size that are positionable anywhere within the 3D seismic data volume, and with each test plane including a significant portion of at least one seismic trace. A large number of data points are then designated throughout the seismic data volume, which are selected individual points on the seismic traces and which are associated with x, y and z space coordinates defining the location of the data points in the seismic data volume. An FP value and an azimuth value is determined for each data point in the seismic data volume to create the FP data volume.

An automatic fault picking computer routine utilizes the FP data volume to build a fault plane model file of enhanced fault data, which can be merged with conventional or other enhanced seismic data to aid in interpretation. The automatic fault picking begins by applying a threshold value to the FP data volume. In the following steps, multiple time slices are constructed through the FP data volume, and fault strips are identified in each time slice. A fault strip index file is then created by identifying related strips in adjacent time slices according to criteria including overlap of strips, and azimuth associated with each point. Next the indexed strips are grouped into regions which contain related strips, and a histogram of azimuth values is constructed for each region. Using the azimuth histogram, substrips are extracted from the strip index file, and a candidate fault surface constructed through the longest strip retrieved. The "goodness of fit" is then determined for each substrip to the candidate surface, and this surface is adjusted in dip to maximize the number of substrip points near its surface, and the adjusted surface is written to the fault plane model file.

In a preferred embodiment, the FP values stored in the FP data volume are determined by evaluating multiple test planes having various assumed strike as well as various assumed dip orientations and uses well known cross correlation and average amplitude comparison techniques for determining FP probability values. Also, in this embodiment, processing of the 3D seismic data volume to determine an optimal azimuth of a test plane, is preceded by processing to determine and restrain structural dip. Then multiple test planes having various assumed dips are evaluated at the previously determined optimal azimuth, and used in finding a maximum FP value for each data point. Fault lineaments are then automatically picked by analyzing values in the FP data volume which exceed a threshold. Linear patterns in the time slices are detected, and an enhanced fault plan model is created.

In accordance with another aspect of this invention consolidated displays that aid seismic interpretation are constructed by merging conventional or other enhanced seismic data, such as stratigraphically enhanced data, with the fault plane model file.

In yet other aspects, apparatus according to this invention includes a computer programmed for processing seismic data according to the above described method, and a program storage device comprises a computer readable medium having computer program code embodied therein for causing the computer to carry out the above described method.

Still other objects and advantages of the present invention will become readily apparent to those skilled in the art from the following detailed description and the drawings, wherein there is shown and described only the preferred embodiments of this invention.

The method and apparatus of this invention using cross correlation and amplitude comparison techniques applied to seismic traces in selectively oriented parallel test planes is optimized for fault plane discrimination of all types of faults. The method emphasized dual attribute comparisons of cross correlation and average amplitude difference, and does not search for specific waveform signatures to detect fault planes. Accordingly, it is a highly reliable enhancement tool for fault plane detection, and further facilitates combining a fault plane enhanced data with conventional amplitude data as well as data enhanced for stratigraphy or geological properties such as porosity and density.

BRIEF DESCRIPTION OF THE DRAWINGS

The file of the patent contains at least one drawing executed in color. Copies of this patent with the color drawing will be provided by the Patent and Trademark Office upon request and payment of the necessary fee.

FIG. 5($b$) is a flow diagram illustrating automatic fault picking steps for constructing a fault index file.

FIG. 5($c$) is a flow diagram illustrating automatic fault picking steps for constructing a fault model file.

FIG. 10($a$) is a pictorial view illustrating the programming step for creating a candidate surface.

FIG. 10($b$) is an edge view illustrating dipping positions of the candidate plane shown in FIG. 10($a$).

FIG. 10($c$) is an edge view illustrating translated positions of the candidate plane shown in FIG. 10($a$).

FIG. 11($a$) is a computer generated color display illustrating fault lineaments picked according to this invention.

FIG. 11($b$) is a view similar to FIG. 11($a$) processed in accordance with prior art techniques.

FIG. 12 is a computer generated color display illustrating a consolidated stratigraphic volume display.

DETAILED DESCRIPTION OF THE INVENTION

Fundamental to the inventive fault enhancement algorithms in this invention is the concept that fault planes will produce detectable changes in the planar discontinuity or time position of adjacent traces in 3D seismic data volumes. These changes may result in a number of different factors including waveform and amplitude changes caused by defocusing within the fault zone, dip changes, azimuth changes and offset horizons across the faults. Seismic discontinuities may also result from geological features unrelated to faults, however, the data processing in this invention selectively enhances only those discontinuities which tend to have planar distributions, and which have dips steeper than 45 degrees. This effectively eliminates most discontinuities unrelated to faults. Also, in many cases, fault surfaces are not strictly planar and may include significant curvature, but considering the small scale of the test planes used in this invention relative to the actual fault structure, the test using multiple small planar test surfaces is a very reasonable approximation.

Figure 1:
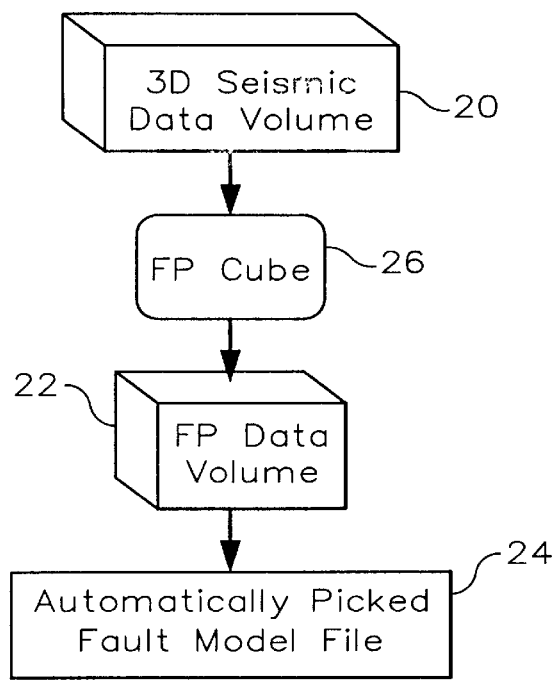
FIG. 1 is a simplified pictorial view illustrating data flow and data conversion for constructing a fault model file according to this invention.

The basic data to which this invention is applied is in the form of a spacial sequence of seismic time or depth scaled traces, which have been recorded, digitized, stacked and properly migrated over appropriate time or depth windows, as is known in the art. Referring now to FIG. 1, which is a simplified illustration of a data conversion scheme used in this invention, seismic data arranged in a spacial sequence of seismic depth or time scale data, and referred to herein as a seismic data volume, is illustrated at 20 in FIG. 1. The seismic data volume 20 in FIG. 1 contains a large group of data points which are selected points on the seismic traces, and this volume is converted to a data volume designated as FP data volume illustrated at reference characters 22, and which is used in an automated fault picking scheme to create the fault model file illustrated at 24. This conversion as well as an automatic picking routine is accomplished in a computer software program referred to herein as FPCube, which is illustrated at 26, and will be more fully explained hereinafter with reference to FIG. 2 through FIG. 5. According to this invention, FP data volume 22 contains FP values, azimuth values, and x, y and z coordinates for each point in the seismic data volume 20. The FP values are representative of the probability that the corresponding point lies on a fault plane. For example, the FP values may range from zero to sixty with zero representing minimum probability that the point lies on a fault plane.

In this conversion scheme deviations in reflection or wavelet continuity of 3D seismic data are automatically detected across a fault plane using the FPCube software program. This software is designed to enhance planar discontinuities, so as to give a strong response for faults of all types, and can often detect faults with minimal offsets. The resulting FP data volume shown at 22 is used for automated fault picking.

Figure 2:
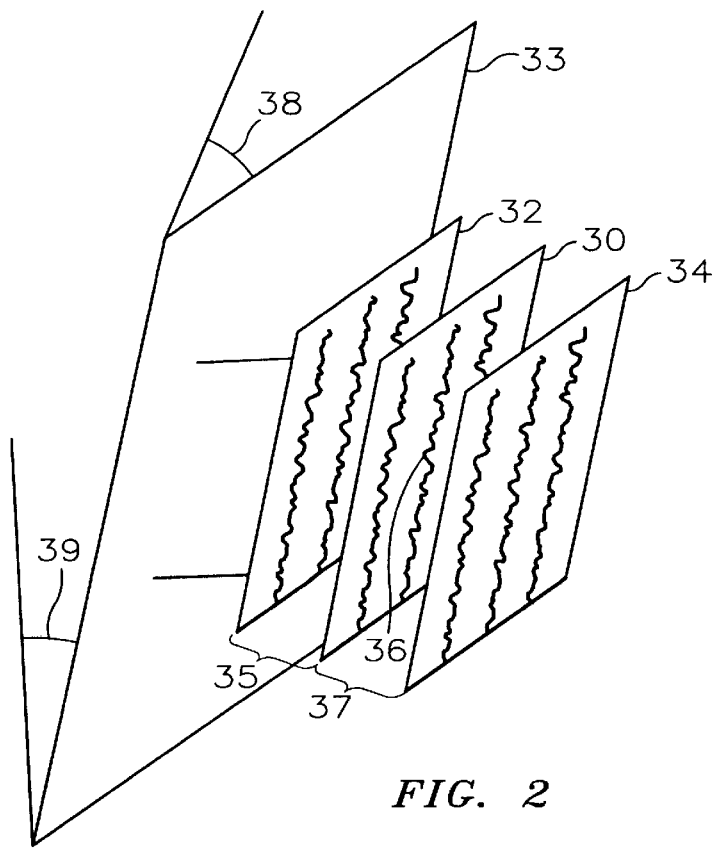
FIG. 2 is a perspective view illustrating a fault plane and three parallel test planes used in calculations for FP values.
Figure 3:
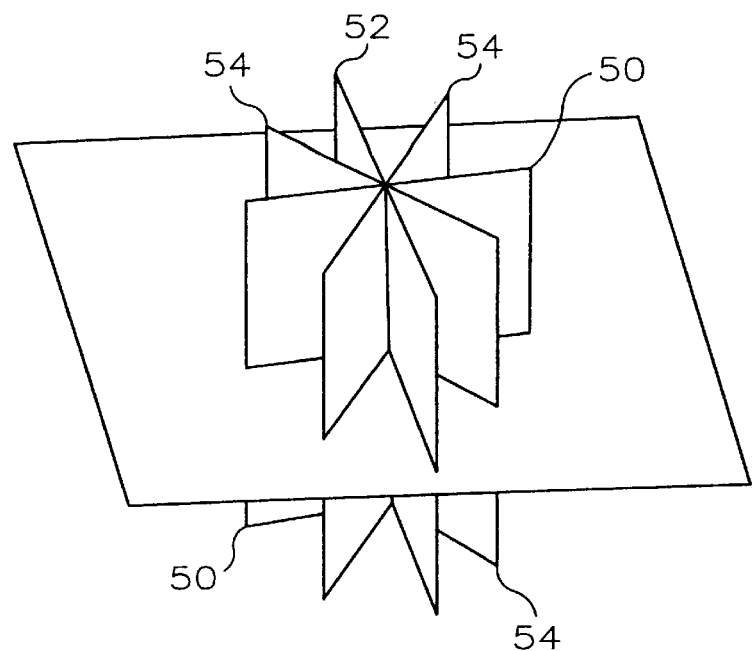
FIG. 3 is a perspective view illustrating arrangement of test planes for determining an optimal fault plan azimuth.
Figure 4:
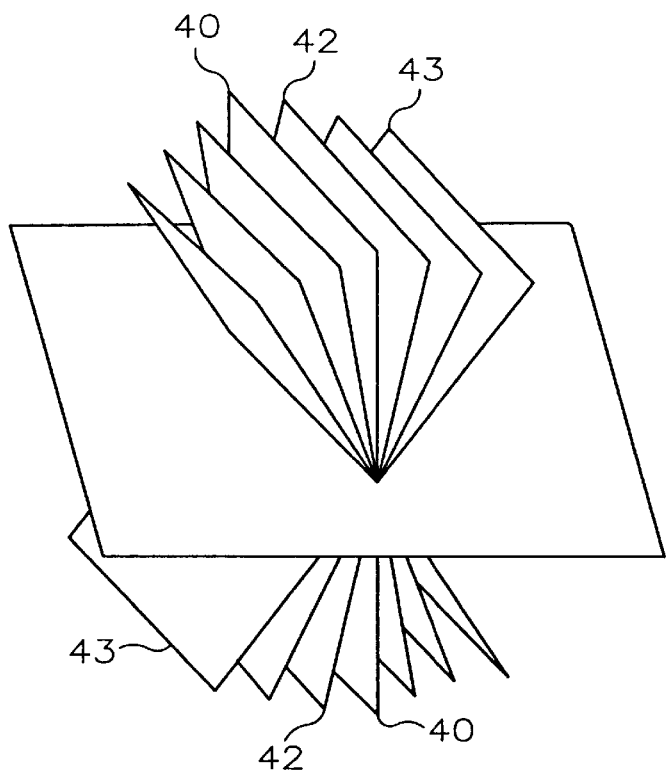
FIG. 4 is a perspective view illustrating arrangement of test planes for determining an optimal fault plan dip.

The FPCube software routine which determines the FP value and an azimuth value at each point in the seismic data volume, is illustrated in FIGS. 2–4. Referring first to FIG. 2, an assumed fault plane is illustrated at 33 and three parallel test planes each containing portions of three seismic traces are illustrated at 30, 32 and 34. The best fault plane detection will occur when the test planes 30, 32 and 34 are positioned parallel to the fault plane 33, such that correlations which detect discontinuities are perpendicular to the fault plane 33. Maximum discontinuity will occur when one or more of the test planes 30, 32 and 34 is completely within the fault zone, and maximum continuity will occur when all of the test planes lie outside the fault plane 33 within regions of coherent data.

In computing an FP value, traces from the center plane, are paired with corresponding traces from adjacent planes 32 and 34. For the central plane 30 and its adjacent plane to the left 32, a cross correlation and an average amplitude difference are determined for each corresponding trace pair, and these values are averaged at each of the three trace pairs in the two planes. This produces a composite left correlation value. The same comparison is performed between the center plane 30 and right hand plane 34. The left and right composite correlation values are then averaged to calculate the FP value assigned to the evaluation point 36.

As indicated above the test planes must be oriented parallel to the fault plane for maximum effectiveness of this invention. In FIG. 2 fault plane dip is indicated by the angle at reference numeral 39, and azimuth or strike is indicated by the angle 38. The azimuth (or strike) of a fault plane must be considered in any seismic discontinuity analysis. Referring now to FIG. 3, the program FPCube determines the discontinuity at several assumed azimuth positions of test planes. Preferably at least four azimuths are evaluated by computing FP values, i.e., an in-line position illustrated at 50, a crossline position illustrated at 52, and two intermediate or diagonal test planes positioned at 54. The largest FP value from the four separate tests establishes an optimal azimuth that is most closely oriented to the subterranean fault plane.

Since a fault plane is usually not precisely vertical, the dip of the fault must also be considered in a seismic discontinuity analysis. To best align the dip of three test planes with the fault, the FP value for each evaluation point is determined at the optimal azimuth for several different dips, for example $-60°$, and $60°$ from vertical. Referring now to FIG. 4, an FP value is first determined with all three planes oriented vertically as illustrated at 40. The planes, still at the optimal azimuth position, are then tilted at some positive incremental angle such as illustrated at 42 in FIG. 4, and another FP value is calculated. This incrementing continues until the positive dip angles ranging between vertical and $45°$ have been completed. The procedure is repeated for negative dip angles over the same angular range. The result is a list of FP values for a series of dips, and the dip with the highest FP value, which indicates maximum discontinuity, is assumed to be the closest orientation to the actual fault plane dip. This is the final FP value that is written to the FP fault volume 22.

In a prototype implementation of this invention, it has been noted that as separation distances between the center plane and the left and right test planes, as shown at numerals 35 and 37 respectively in FIG. 2, increases, differences in geology also increases leading to greater dissimilarity. In using a regular rectangular grid, it is also noted that the greater separation between diagonal test planes compared to in-line test planes usually results in higher noise. Accordingly, FPCube allows processing of only one azimuth at a time. This feature may be useful in evaluating which azimuths contribute most reliably to the FP values and which azimuths are the noisiest. In some cases, it may be possible to omit the noisiest azimuth(s) from the processing.

As those skilled in the art can appreciate, the method of this invention requires a very large amount of detailed calculations, such as computing fault test plane parameters included in the FP data volume and a fault picking routine. While computer software for various portions of the present invention is commercially available, FIGS. 5(a), (b) and (c) is a flow diagram for a novel computer implementation of this invention relating to programmed steps for computer implementation of fault identification and automatic fault picking and display.

Figure 5A:
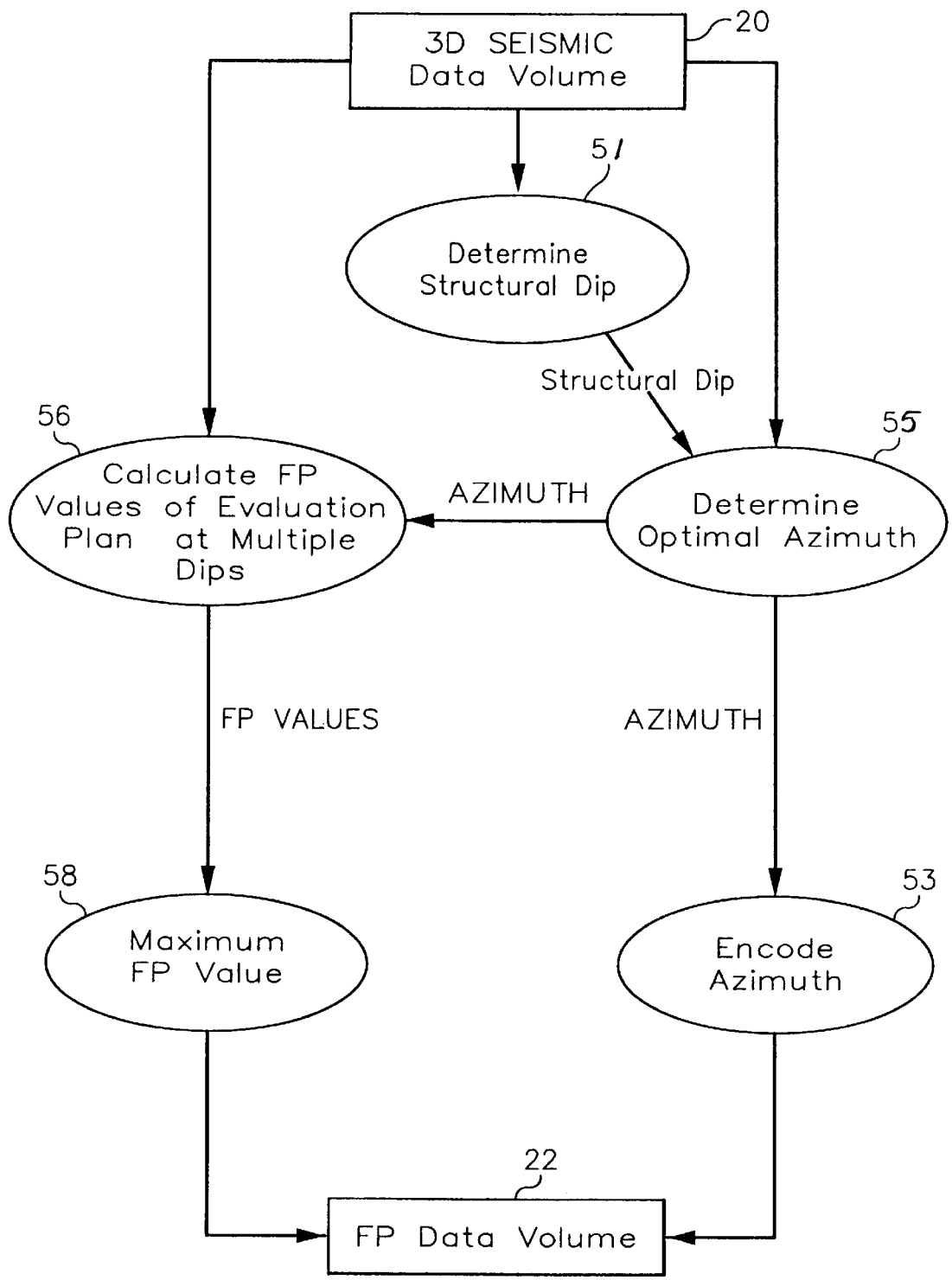
FIG. 5($a$) is a flow diagram illustrating programmed steps for conversion of a seismic trace data volume to a fault plane data volume.

In FIG. 5(a), initially as shown at 20, all seismic amplitude data is assembled to provide the required 3D seismic data volume. In parallel flow paths the seismic amplitude data is provided to three computational blocks illustrated at 51, 55 and 56. In block 55 the optimal azimuth is calculated by selecting the largest FP value of preferably at least four test azimuths, as illustrated in FIG. 3, and this optimal azimuth is encoded in block 53 and provided to FP data volume 22. In programming step 51, the program FPCube determines and compensates for structural dip before calculating FP values of the test planes at multiple azimuths in programming step 55. This is accomplished by shifting the test planes through a series of positive and negative sample offsets and correlating to find the offset with maximum continuity. This offset with maximum continuity will represent structural dip, and it is at this offset that final FP calculations for dip in programming step 56 are made. This process of compensating for structural dip by shifting samples is normally called lagging and is expressed as the number of samples to shift up and down when testing for dip. Because trace distances vary with different azimuths, expressing the search for structural dip by the number of samples can lead to a significant variation in the angles through which the search is made. Furthermore, it confines the search to the same number of samples in all directions. Forcing azimuths with shorter distances to use the same number of lags as azimuths with longer distances may introduce additional noise, or alternately "heal" small faults. Accordingly, FPCube incorporates an "adaptive lagging" scheme that automatically determines the number of lags required for each azimuth's trace distance based on a user supplied angle of maximum structural dip. This provides a simple and consistent method for specifying lagging in all azimuths and resolves problems associated with varying trace spacing distances for different azimuths.

Next, the FP values calculated in block 56 are provided to programming step 58, where the maximum FP value is determined and presented to the FP data volume 22.

The data processing described with reference to FIGS. 5(*b*) and 5(*c*) illustrates automatic fault picking. Upon program initiation the computer, as illustrated in programming step 60, scans and retrieves from the FP data volume 22 all FP values greater than the threshold value illustrated at flow line 62, and stores these values in a data file called thresh.points illustrated at 64. Next as shown at programming step 66 the thresh.points data volume 64 is sorted into a desired number of time slices which are stored in time slice files called tslice 1 . . . n.points. These tslice files are shown at 67, 68 and 69. The next programming step 70 builds fault strips for each tslice file on an x, y grid according to user supplied criteria for maximum and minimum strip length and a correlation coefficient, which are illustrated at the bracket 71. In this step all possible strips meeting maximum strip length criteria are constructed. The strip length is then reduced and strips are constructed until the minimum strip length is completed. Next in programming step 72 the strips are related according to an overlap criteria, which is illustrated in FIG. 6. Referring now to FIG. 6 which shows the selected fault plane points on a common x, y grid for two adjacent time slices. As illustrated, time slice A has ten points and time slice B has twelve points. According to the overlap criteria, which defines a maximum separation distance between related points, eight points on the B strip overlap with seven points on the A strip. Another user defined criteria for overlap requires a specified number of points to be within the overlap separation distance before treating the strips as related. In FIG. 6 the overlapping points are enclosed in the dashed line C.

Figure 6:
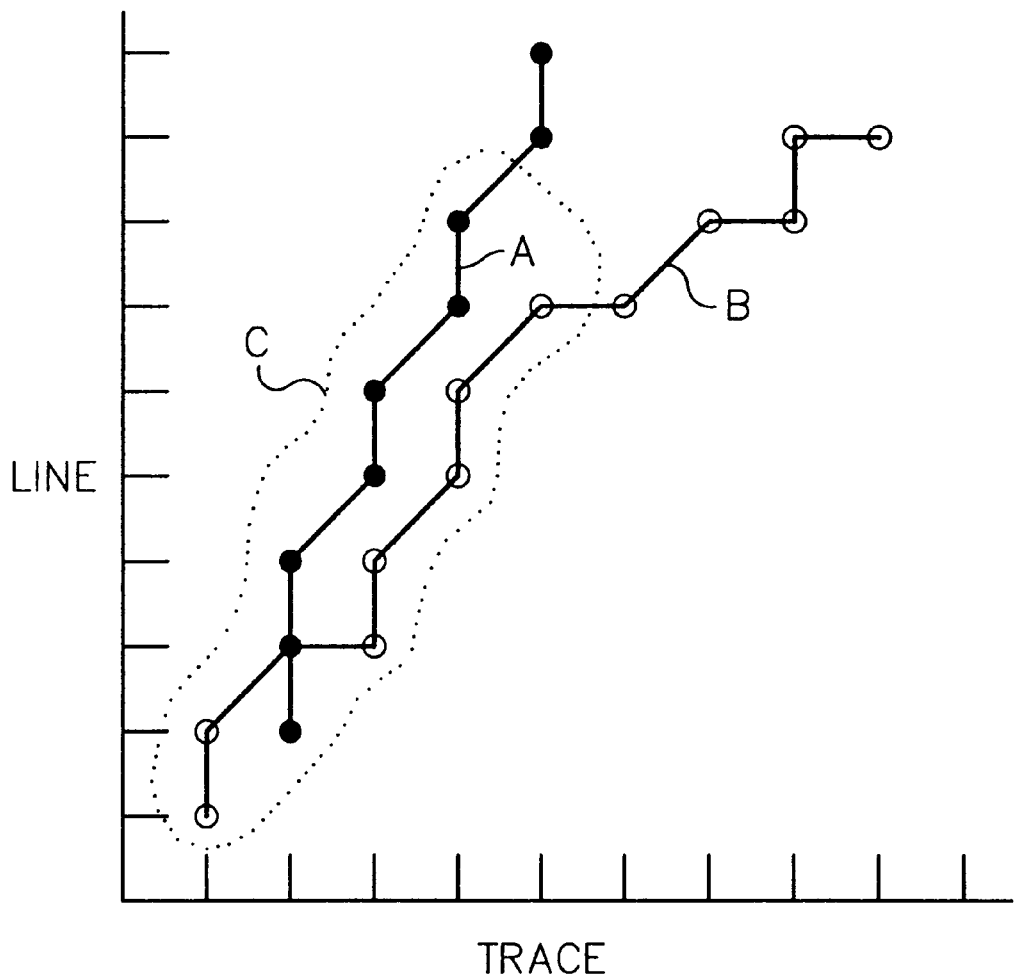
FIG. 6 is a graphic illustration of a programming step, that relates strips according to overlap criteria.
Figure 7:
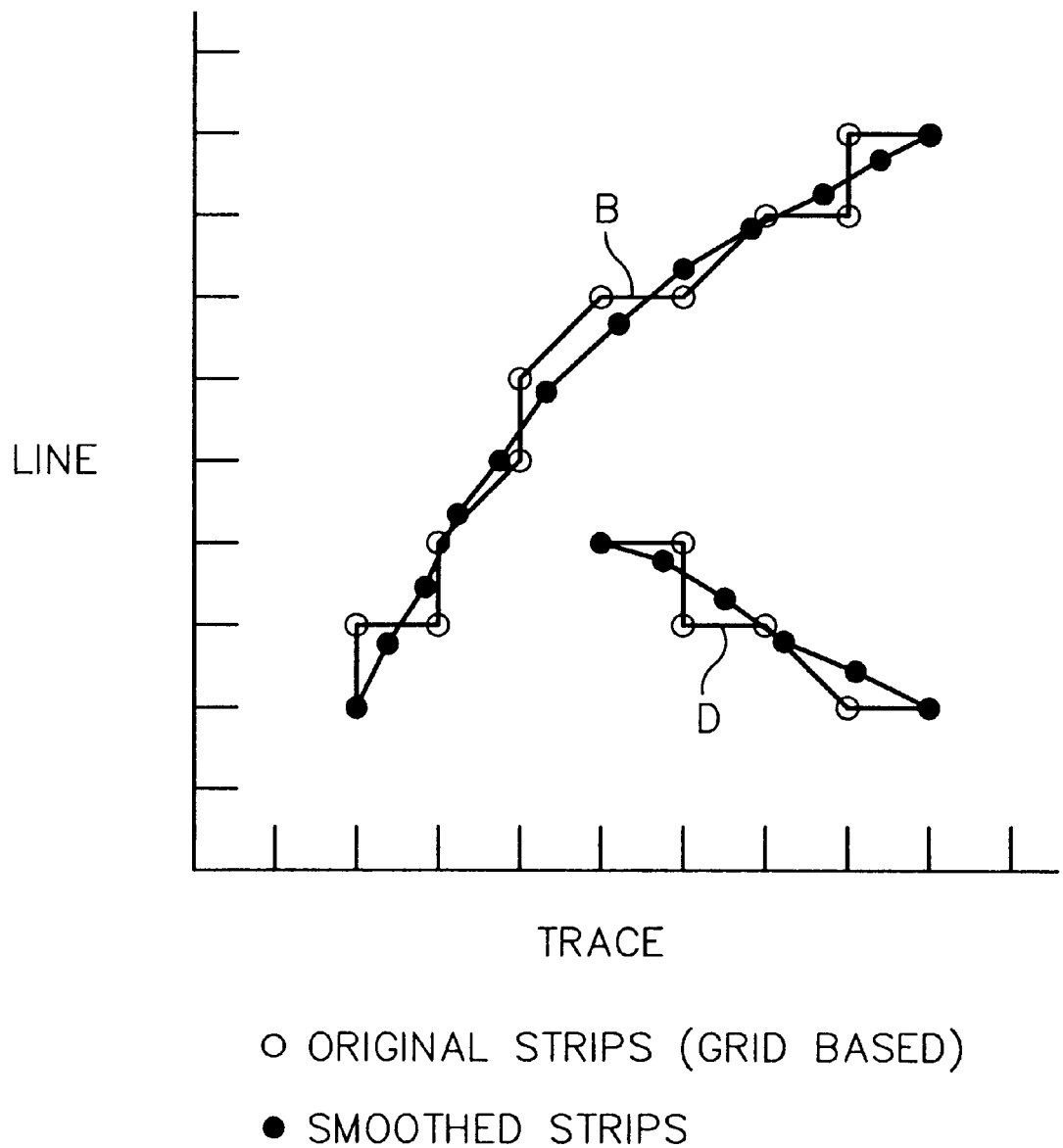
FIG. 7 is a graphic illustration of a programming step of smoothing strips and azimuths at each point.

Referring now again to FIG. 5(*b*) the overlap-related seismic strips are processed in program step 74 for smoothing the strips and azimuth of each point. This smoothing is illustrated in FIG. 7, where strip B previously shown in FIG. 6, and another strip D are shown overlaid with smoothed strips. A smoothing length criteria shown at 76 in FIG. 5(*b*) specifies a number of points to be averaged to obtain the x, y coordinates of the smoothed point. The smoothed strips are stored in a data file called strips.ndx illustrated at 78 in FIG. 5(*b*) and FIG. 5(*c*).

Figure 5B:
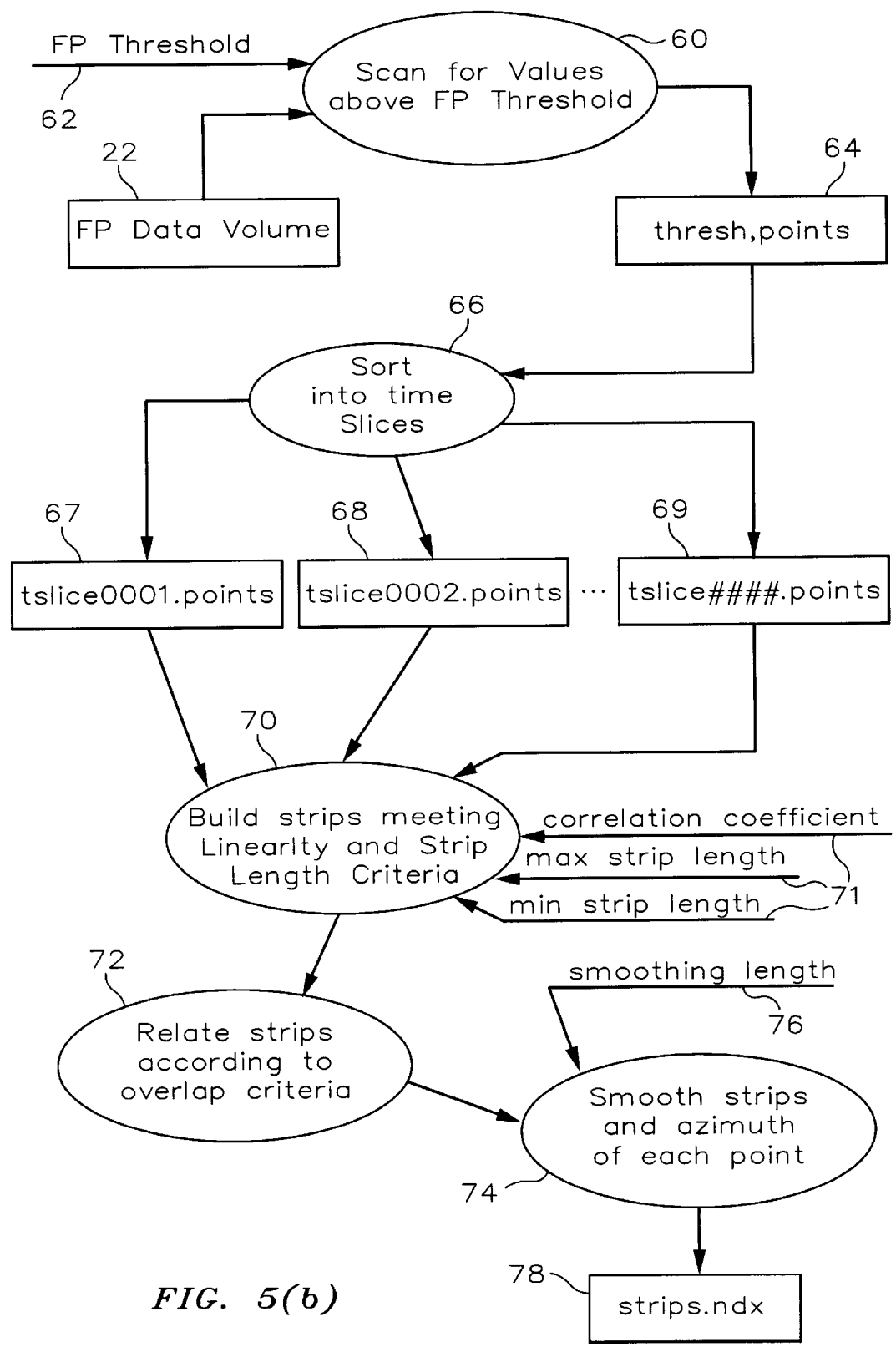
Figure 5C:
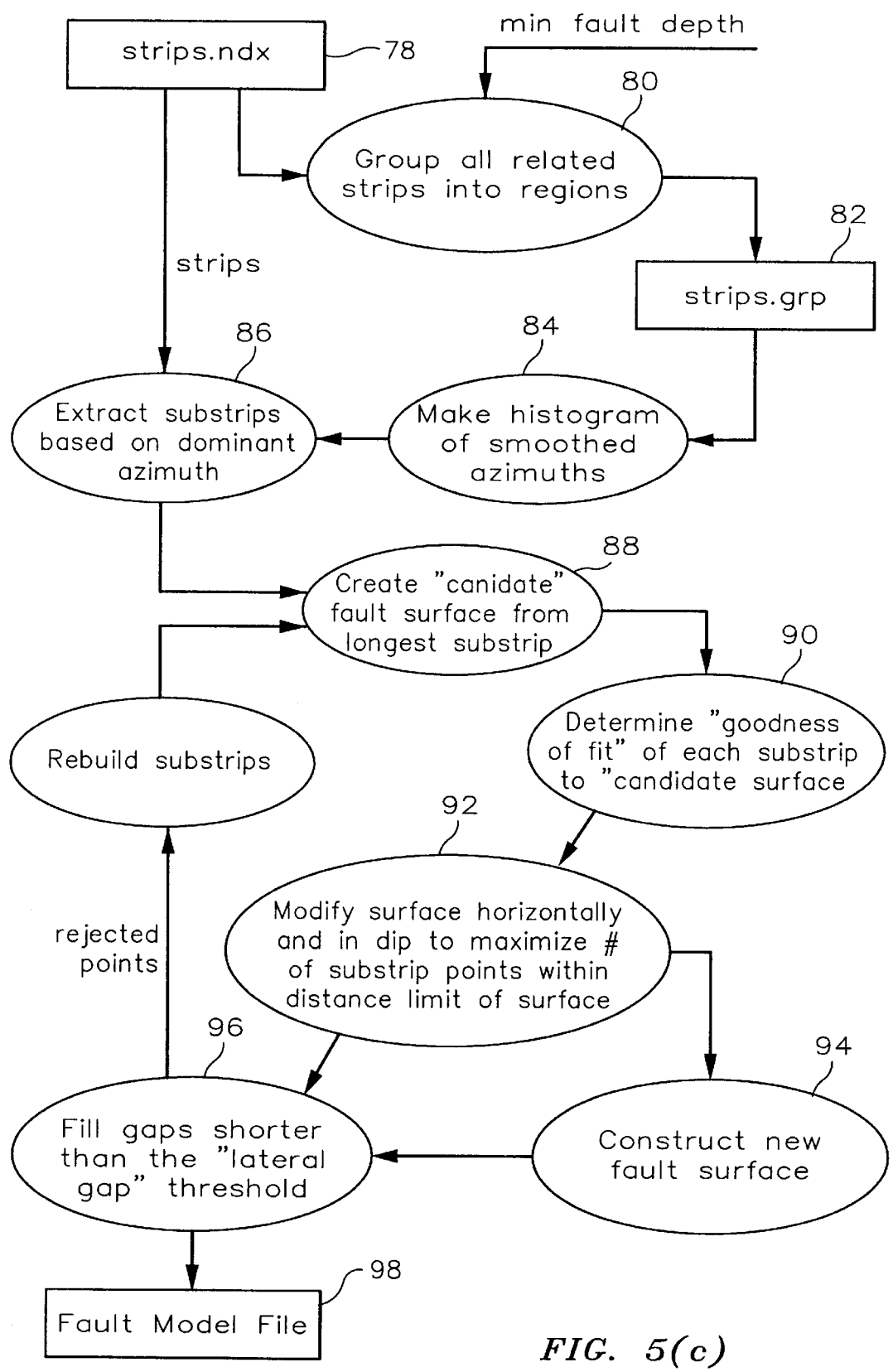
Figure 8:
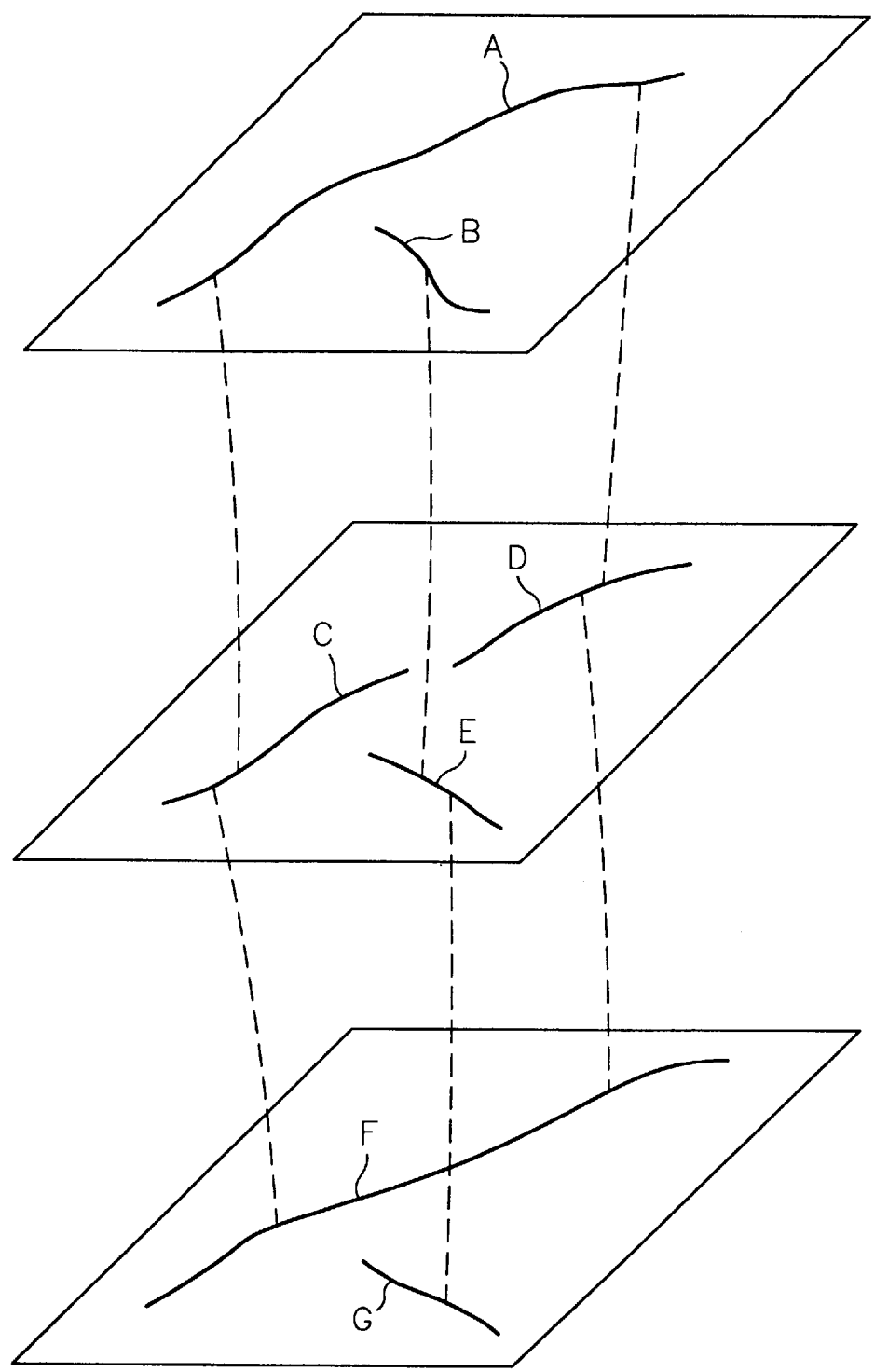
FIG. 8 is a pictorial view illustrating a programming step for grouping related strips into regions.
Figure 9:
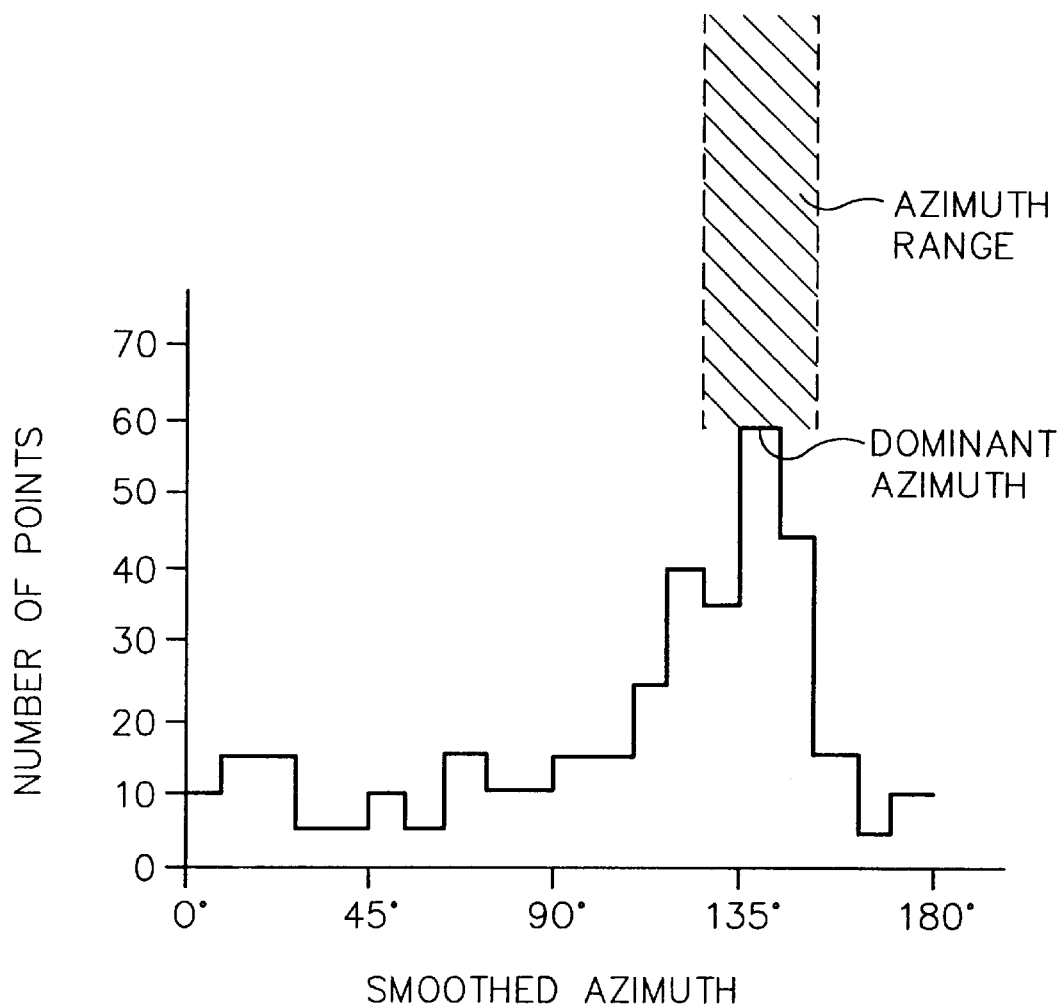
FIG. 9 is a histogram of azimuths.

Referring now to FIG. 5(*c*), in programming step 80 all related strips are grouped into regions over a specified minimum fault depth, as shown in FIG. 8. Three adjacent time slices are illustrated in FIG. 8 for comparison of fault strips designated as A, B, C, D, E, F and G. Comparison of the upper and middle time slices indicates that strip A in the upper time slice relates to strips C and D in the middle time slice and further strip B in the upper time slice relates to strip E in the middle time slice. Further, comparison relating to the middle and lower time slices indicates that strips C and D in the middle time slice relate to strip F in the lower time slice, and that strip E in the middle time slice relates to strip G in the lower time slice. Accordingly, two groups are formed over the depth of the three time slices as follows:

The first group includes strips A, C, D and F; and a second group includes strips B, E and G. Groups failing to meet fault depth criteria are rejected. The rest are stored in a file called strips.grp, as shown in 82 in FIG. 5(*c*). In the next programming step 84, a histogram of azimuths is constructed to determine a dominant azimuth and an associated azimuth range for each group. Such a histogram is illustrated in FIG. 9, with the azimuth range shown as a shaded area surrounding the dominant azimuth at 135°. In programming step 86 substrips are extracted from the strip.ndx file 78 based on the azimuth range shown in FIG. 9. Next in programming step 88 a candidate fault surface is created for the longest substrip. Such a fault surface is illustrated in FIG. 10(*a*) having a longest substrip designated L and multiple related substrips designated S. In step 90 the "goodness of fit" of each substrip to the candidate surface is determined and substrips outside a specified range are rejected. In step 92, the candidate surface is modified to maximize the number of substrip points included in the surface. The test dips and the adjusted dip of the candidate plane is shown at 93 in FIG. 10(*b*) and the test translations and the adjusted translation of the plane is shown at 95 in FIG. 10(*c*). Also illustrated in FIG. 10(*c*) are data points in the substrips. A new fault surface which includes the accepted substrip points is constructed in step 94 and in step 96 gaps in the strips shorter than a specified threshold are filled in. Finally the accepted fault strip models are stored in a fault model file shown at 98.

A colored plot using a number of shades and hues to show a wide range of seismic amplitude values is shown in FIG. 11(*a*) and FIG. 11(*b*), with fault lineaments (illustrated by dark blue vertical lineaments) automatically picked. For comparison FIG. 11(*b*), which is same seismic data as FIG. 11(*a*) processed according to prior art techniques, is illustrated, where faults are manually picked by a geophysicist. As illustrated, the automated fault picking according to this invention provides more detailed fault picking than is practical with manual techniques. Alternately, the automated picking can be used interactively, since the automatically picked faults can be either accepted or rejected by the geophysicist.

Further in accordance with this invention, a display for visualizing both stratigraphic and fault information, referred to herein as a stratafault volume display, is constructed using the seismic amplitude data volumes. A stratafault volume display, which is also computer generated is illustrated in FIG. 12, is constructed by merging a fault model file such as illustrated at 98 in FIG. 5(*c*) with a stratigraphically enhanced model file, not illustrated.

The invention as described and illustrated herein is an effective method, apparatus and article for more universally identifying faults as well as automating and accelerating construction and display of fault lineaments from seismic data. However, those skilled in the art will recognize that many modifications and variations of the present invention are possible in light of the above teachings without departing from the invention. Such modifications and variations might include other techniques for determining probability factors required in the present invention. Accordingly, it is to be understood that the present invention is not intended to be limited by the particular features described and illustrated in the drawings, but the concept of the present invention is to be measured by the scope of the appended claims.

That which is claimed is:

1. A computer implemented method for automatically determining a fault lineament detectable in a three-dimensional (3D) seismic data volume containing a plurality of seismic traces arranged as a plurality of data points having x, y and z coordinates defining a physical location in said seismic data volume, wherein said data points are selected individual points on said seismic traces, said method comprising:

a) converting said 3D seismic data volume to a fault plane (FP) data volume containing a plurality of probability factors, referred to herein as FP values, wherein an FP value and coordinates for said physical location for said FP values are associated with each of said plurality of data points in said 3D seismic data volume;

b) determining at least one strip of said physical locations in said FP data volume having a high probability of residing on a subterranean fault plane detectable in said seismic data volume;

c) converting said at least one strip of physical locations having a high probability to a line; and d) displaying said line as a fault lineament.

2. A method in accordance with claim 1, wherein said step of converting said seismic data volume to said FP data volume comprises:

a) defining a plurality of parallel test planes of selectable area positionable throughout said 3D seismic data volume, wherein each of said plurality of test planes contains a number of said data points corresponding to a significant portion of at least one of said plurality of seismic trace;

b) determining an FP value and an optimal azimuth for at least one of said plurality of test planes, herein designated as an evaluation plane, wherein said FP value is based on cross correlation and average amplitude difference between corresponding traces in at least two of said parallel test planes;

c) wherein said evaluation plane is associated with one of said data points located at the center of said evaluation plane, herein designated as an evaluation point;

d) assigning said FP value and said azimuth value for said evaluation plane to said evaluation data point; and e) repeating steps a), b), c) and d) for each of said plurality of data points in said seismic data volume, thereby forming said fault plane data volume.

3. A method in accordance with claim 2, wherein each of said FP values is determined with said plurality of test planes oriented in dip and azimuth substantially matching the dip and azimuth of said subterranean fault plane detectable in said seismic data volume.

4. A method in accordance with claim 3, wherein said substantially matching azimuth of said plurality of test planes, herein designated as an optimal azimuth, is determined according to the following steps:

orienting said plurality of test planes vertically in a plurality of different azimuths ranging from seismic in-line to cross-line positions;

determining said FP value of said evaluation plane at each of said plurality of different azimuths; and selecting said optimal azimuth as the azimuth orientation producing the maximum FP value determined for said plurality of different azimuths.

5. A method in accordance with claim 3, wherein said substantially matching dip of said plurality of test planes is determined according to the following steps:

orienting said plurality of test planes at said optimal azimuth in a plurality of different dips ranging from about +45 degrees to about −45 degrees;

determining said FP value of said evaluation point at each of said plurality of different dips; and selecting said substantially matching dip as the dip orientation producing the maximum FP value for said plurality of different dips.

6. A method in accordance with claim 2, wherein said step of determining said FP value comprises:

computing a crosscorrelation value between corresponding traces in at least two adjacent parallel test planes;

computing an average amplitude difference value between corresponding traces in said at least two adjacent parallel test planes; and averaging said crosscorrelation value and said average amplitude difference value to determine said FP value.

7. A method in accordance with claim 1, wherein said step of determining at least one strip of locations in said FP data volume having a high probability of residing on said subterranean fault plane, herein referred to as a probability strip, comprises:

selecting FP values in said FP data volume that are above a threshold value to define a plurality of selected FP values having a high probability of residing on said subterranean fault plane;

storing said plurality of selected FP values and associated physical locations in a threshold data file;

sorting said threshold data file into a plurality of time or depth slices, wherein each of said time or depth slices contains at least two of said selected FP values having a high probability of residing on said subterranean fault plane;

building one or more of said probability strips in each of said plurality of time slices, wherein each of said probability strips is a generally linear series of locations of said selected FP values mapped onto an x, y grid; and wherein said probability strips are constrained by criteria for minimum strip length, maximum strip length and a correlation coefficient.

8. A method in accordance with claim 1, wherein said high probability is a probability greater than one-half.

9. A method in accordance with claim 7, wherein said step of converting at least one strip of said physical locations having a high probability of residing on a fault plane, to a line comprises:

relating said probability strips found in vertically adjacent time slices according to an overlap criteria, wherein said probability strips having at least a minimum overlap of locations are combined;

averaging coordinates of said physical location and azimuth of said probability strips to define a line, wherein the location of a point on said line is the average location of at least a minimum number of said coordinates of physical locations on said probability strips; and storing the location of said lines in a line indexed file.

10. A method in accordance with claim 9, wherein a fault model file is created, said method comprising:

grouping related lines in said line indexed file into regions defined by a specified minimum fault depth, wherein groups containing a plurality of lines related in azimuth and fault depth, herein designated as line groups, are constructed;

constructing a histogram of azimuths of said line groups;

extracting lines from said line indexed file having an azimuth substantially matching a dominant azimuth in said histogram;

creating a candidate fault surface having the longest line extracted from said line indexed file in the previous step horizontally positioned at the center of said candidate surface;

determining the proximity of remaining sublines extracted from said line indexed file to said candidate surface, and rejecting sublines outside a specified maximum distance;

adjusting said candidate surface horizontally and in dip to maximize the number of sublines within said specified maximum distance to define a modified candidate surface;

filling in gap in said lines that are less than a specified lateral gap threshold; and writing said modified candidate surface to a fault model file.

11. A method in accordance with claim 4, wherein structural dip is determined and restrained prior to executing said step of selecting said optimal azimuth.

12. Apparatus for automatically determining a fault lineament detectable in a three dimensional (3D) seismic data volume containing a plurality of seismic traces arranged as a plurality of data points having x, y and z coordinates defining a physical location in said seismic data volume, wherein said data points are selected individual points on said seismic traces, said apparatus comprising:

a computer programmed to carry out the following method steps:
a) converting said 3D seismic data volume to a fault plane (FP) data volume containing a plurality of probability factors, referred to herein as FP values, wherein an FP value and coordinates for said physical location of said FP values are associated with each of said plurality of data points in said seismic data volume;
b) determining at least one strip of said physical locations in said FP data volume having a high probability of residing on a subterranean fault plane detectable in said seismic data volume;
c) converting said at least one strip of physical locations having a high probability to a line; and
d) displaying said line as a fault lineament.

13. Apparatus in accordance with claim 12, wherein said computer is additionally programmed to carry out the following steps for converting said seismic data volume to said FP data volume, said method steps comprising:

a) defining a plurality of parallel test planes of selectable area positionable throughout said 3D seismic data volume, wherein each of said plurality of test planes contains a number of said data points corresponding to a significant portion of at least one of said plurality of seismic trace;

b) determining an FP value and an optimal azimuth for at least one of said plurality of test planes, herein designated as an evaluation plane, wherein said FP value is based on cross correlation and average amplitude difference between corresponding traces in at least two of said parallel test planes;

c) wherein said evaluation plane is associated with one of said data points located at the center of said evaluation plane, herein designated as an evaluation point;

d) assigning said FP value and said azimuth value for said evaluation plane to said evaluation data point; and e) repeating steps a), b), c) and d) for each of said plurality of data points in said seismic data volume, thereby forming said fault plane data volume.

14. Apparatus in accordance with claim 12, wherein said computer is additionally programmed to carry out the following steps for converting at least one strip of said physical locations having a high probability of residing on a fault plane to a line, said method steps comprising:

selecting FP values in said FP data volume that are above a threshold value to define a plurality of selected FP values having a high probability of residing on said subterranean fault plane;

storing said plurality of selected FP values and associated physical locations in a threshold data file;

sorting said threshold data file into a plurality of time or depth slices, wherein each of said time or depth slices contains at least two of said selected FP values having a high probability of residing on said subterranean fault plane;

building one or more of said probability strips in each of said plurality of time slices, wherein each of said probability strips is a generally linear series of locations of said selected FP values mapped onto an x, y grid; and wherein said probability strips are constrained by criteria for minimum strip length, maximum strip length and a correlation coefficient.

15. Apparatus in accordance with claim 12, wherein said computer is additionally programmed to carry out the following steps for converting at least one strip of said physical locations having a high probability of residing on a fault plane to a line, said method steps comprising:

relating said probability strips found in vertically adjacent time slices according to an overlap criteria, wherein said probability strips having at least a minimum overlap of locations are combined;

averaging coordinates of said physical location and azimuth of said probability strips to define a line, wherein the location of a point on said line is the average location of at least a minimum number of said coordinates of physical locations on said probability strips; and storing the location of said lines in a line indexed file.

16. A program storage device, readable by a computer, tangibly embodying a program of instructions executable by said computer for determining a fault lineament detectable in a three-dimensional (3D) data volume, said seismic data volume containing a plurality of seismic traces arranged as a plurality of data points having x, y and z coordinates defining a physical location in said seismic data volume, wherein said data points are selected individual points on said seismic traces, said method comprising:

a) converting said 3D seismic data volume to a fault plane (FP) data volume containing a plurality of probability factors, referred to herein as FP values, wherein an FP value and coordinates for said physical location for said FP values are associated with each of said plurality of data points in said 3D seismic data volume;

b) determining at least one strip of said physical locations in said FP data volume having a high probability of residing on a subterranean fault plane detectable in said seismic data volume;

c) converting said at least one strip of physical locations having a high probability to a line; and d) displaying said line as a fault lineament.

* * * * *